June 9, 1953   L. F. THIRY   2,641,053
APPARATUS FOR MAKING PRECISION ANTIVIBRATION MOUNTINGS
Original Filed Dec. 3, 1943   3 Sheets-Sheet 1
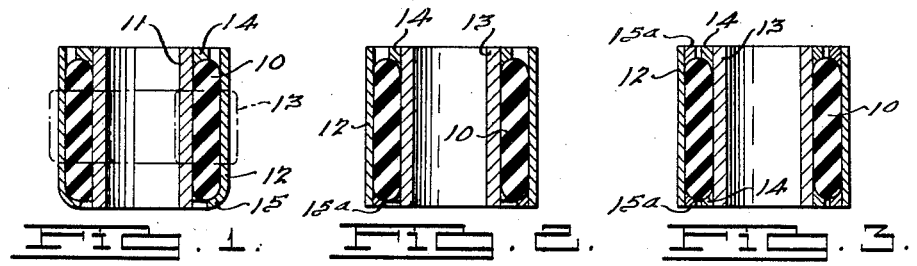
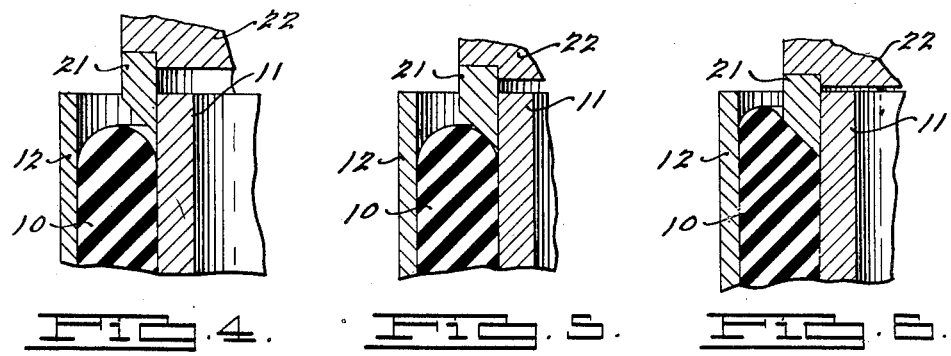
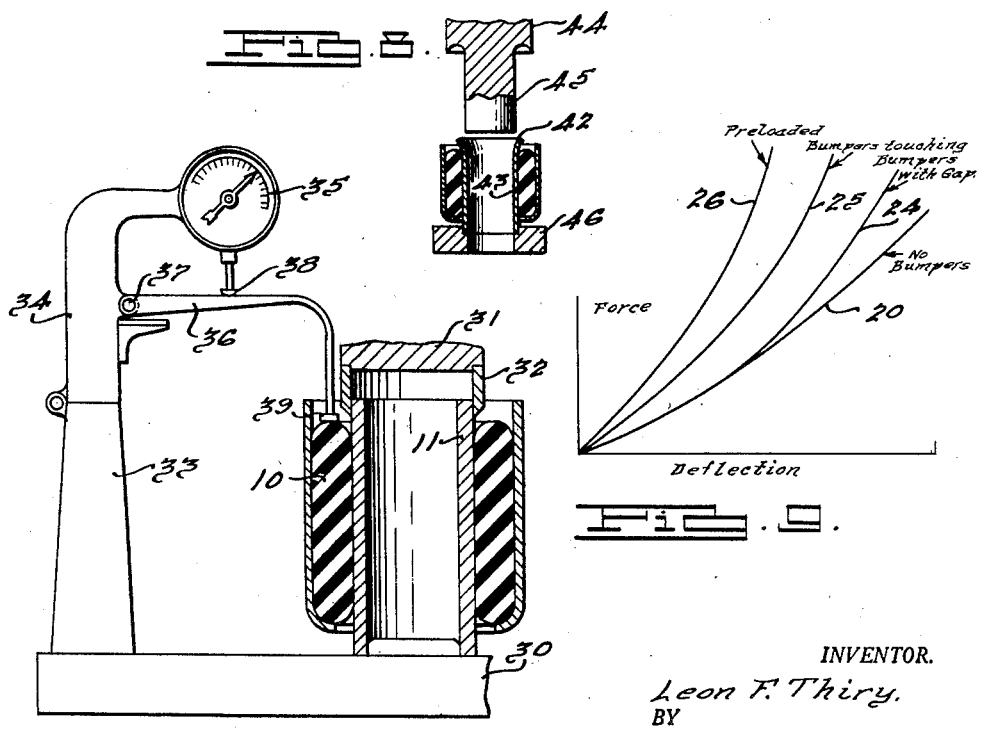
INVENTOR.
Leon F. Thiry.
BY
Evans + McCoy
ATTORNEYS.

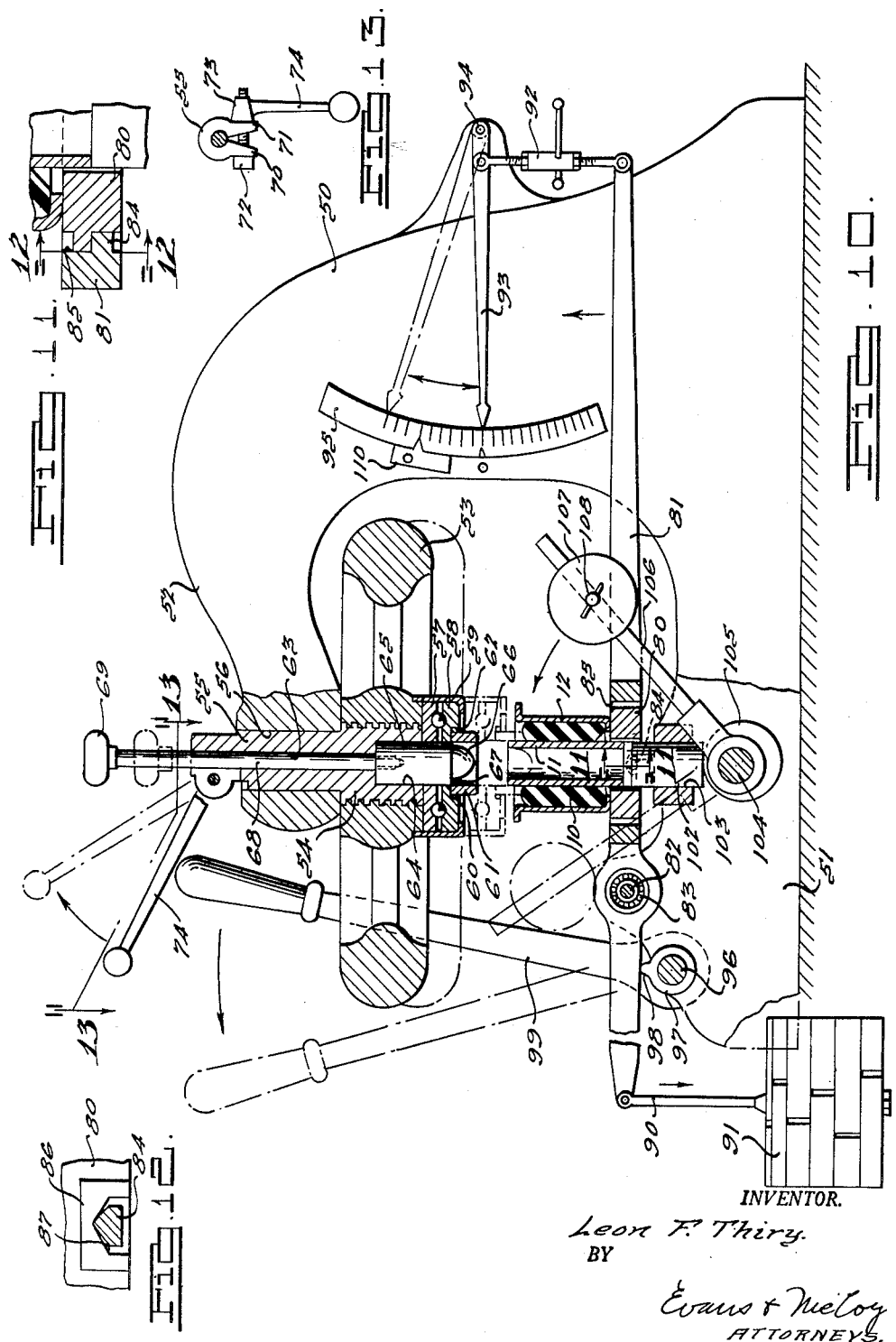

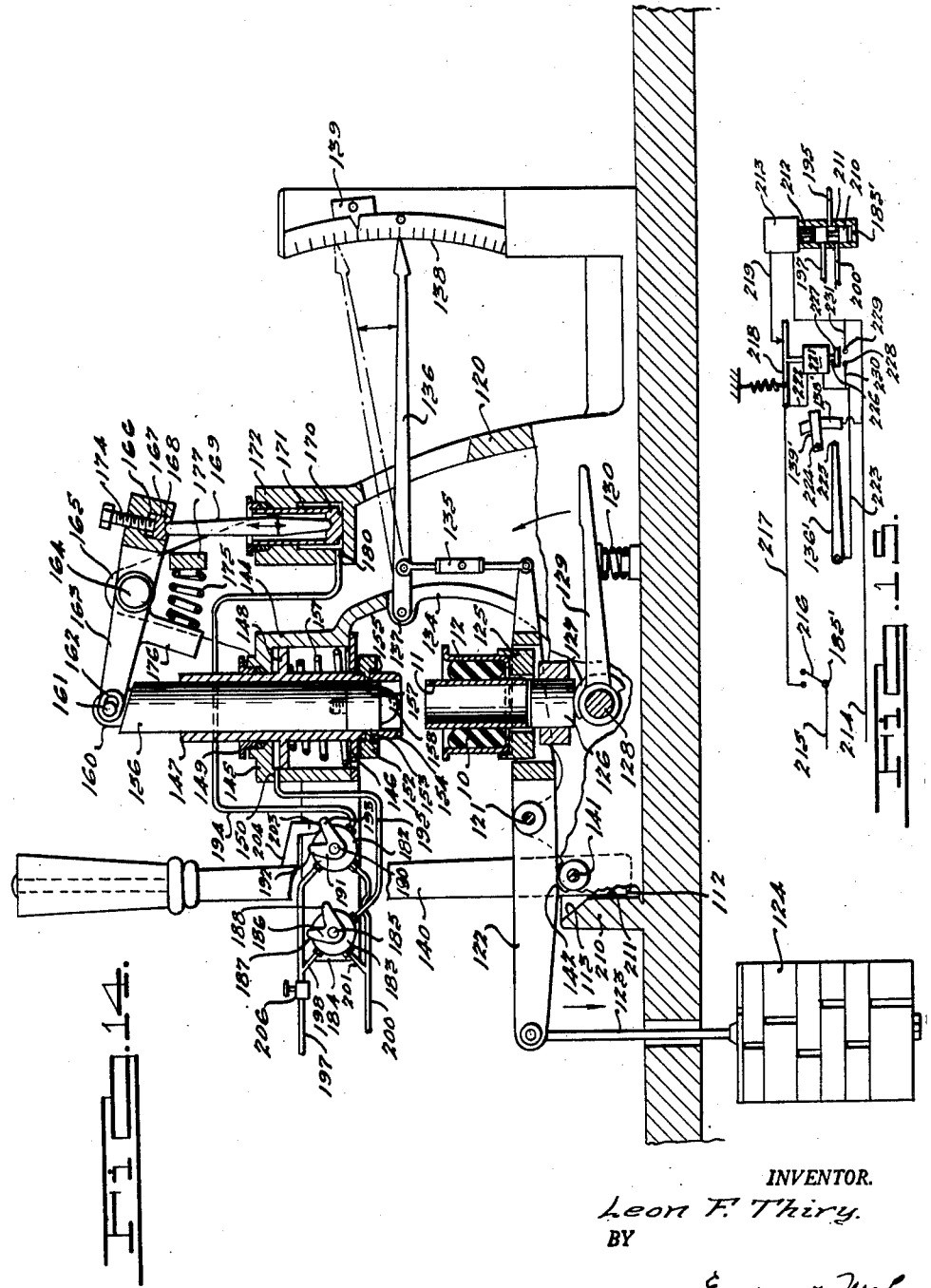

Patented June 9, 1953

2,641,053

UNITED STATES PATENT OFFICE 2,641,053

APPARATUS FOR MAKING PRECISION ANTIVIBRATION MOUNTINGS

Leon F. Thiry, Montclair, N. J., assignor to The General Tire & Rubber Company, Akron, Ohio, a corporation of Ohio Original application December 3, 1943, Serial No. 512,841, now Patent No. 2,446,621, dated August 10, 1948. Divided and this application April 6, 1948, Serial No. 19,308

6 Claims. (Cl. 29—235)

This application is a division of application Serial No. 512,841, filed December 3, 1943, and now U. S. Patent No. 2,446,621.

The present invention relates to vibration mountings of the type employing a pair of relatively rigid members formed of metal, or the like, which are separated by a layer of rubber and in which the principal vibration is absorbed by relative movement between the rigid members in substantially parallel paths. Such mountings may comprise either a pair of spaced concentric members separated by an annular sleeve or ring of rubber or they may comprise two or more relatively flat plates separated by layers of rubber. The term "rubber" as used herein is intended to include both natural and synthetic rubber.

For many purposes it is essential to successful vibration dampening to employ vibration mountings having accurately calibrated deflection rates; that is to say, the amount of displacement of one of the members of the mounting with respect to the other for any given load must fall within narrow limits. The deflection characteristic of any given mounting is a function of many factors, including the size of the various parts, the thickness of the rubber layer and the hardness of the rubber. The deflection characteristic of mountings is also altered by the provision of flanges or bumpers adapted to engage the edge of the rubber layer and resist relative movement of the rigid members parallel to each other. It is also possible to change the deflection curve under various loads by altering the form and size of such a flange or bumper. While for any given installation all of these factors may be selected to produce a mounting of the desired characteristics, nevertheless in actual commercial production the tolerances permitted in the size of the parts, composition and hardness of the rubber and other factors result in a relatively wide variation in the deflection characteristics of mountings that are apparently of identical construction.

Accordingly, it is the general object of the present invention to provide apparatus for adjusting the deflection characteristics of vibration mountings after they are assembled in order to produce a mounting having the desired deflection rates.

More specifically, it is the object of the present invention to provide apparatus for producing a mounting having the desired deflection characteristics by permanently changing the location of one or more of the bumper flanges in the assembled mounting to a predetermined degree.

Other and more detailed objects and advantages of the invention will become apparent from the following specification, the drawings relating thereto and the claims hereinafter set forth.

In the drawings, in which like numerals relate to corresponding parts in the several views throughout;

Figures 1, 2 and 3 illustrate three slightly different types of vibration mountings of the concentric cylindrical sleeve type equipped with annular bumper flanges;

Figures 4, 5 and 6 illustrate three stages in the operation of press-fitting an annular bumper on the inner cylindrical sleeve of a mounting of the type shown in Figures 1, 2 and 3;

Figure 7 shows in fragmentary manner apparatus for determining the proper location of a press-fitted bumper element during the press-fitting operation;

Figure 8 shows a slightly different form of bumper construction, together with a die adapted to alter its form and location;

Figure 9 is a graph showing the manner in which the deflection groove of a mounting may be varied by varying the position of the bumper flanges;

Figure 10 is a side elevation with parts in section of a hand operated machine for press-fitting an annular bumper sleeve on the inner cylindrical sleeve of a mounting to the extent required to produce a mounting of exactly the desired deflection characteristic;

Figure 11 is a fragmentary section taken on the line 11—11 of Figure 10;

Figure 12 is a fragmentary section taken on the line 12—12 of Figure 11;

Figure 13 is a fragmentary section taken on the line 13—13 of Figure 10;

Figure 14 is a side elevation with parts in section of a machine similar to that illustrated in Figure 10 but adapted to operate by hydraulic pressure under the control of the operator;

Figure 15 is a diagrammatic illustration of means adapted to be incorporated in the machine of Figure 14 to effect an automatic stoppage of the bumper moving operation;

In Figures 1 to 3 there is illustrated one form of vibration mounting to which the present invention is applicable, namely, a mounting comprising a pair of concentric members in the form of cylindrical sleeves separated by an annular ring of rubber. As shown in Figure 1, the annular rubber ring 10 is positioned between an inner sleeve 11 and an outer sleeve 12. The rubber is preferably held in position by a mechanical bond; that is to say, by the pressure induced by distorting a vulcanized ring of rubber which, in its free state, is of the form illustrated in the superimposed dotted outline 13 on Figure 1. The rubber ring is compressed radially and allowed to expand axially to the final assembled form illustrated in solid lines, and the tendency of the rubber to return to its initial form creates a strong mechanical bond between the rubber and the cylindrical sleeves. While this type of bond is preferred, it will be appreciated that the rubber ring may be bonded in the final form by vulcanization, if desired. In this type of vibration mounting, the principal freedom of movement between the sleeves is in an axial direction. In order to restrict relative axial movement between the two sleeves, it is customary to provide bumper rings, or flanges, such as the ring 14 press-fitted at the upper end of the inner sleeve 11 and the inturned flange 15 formed on the lower end of the outer sleeve 12.

In the mounting of Figure 1, the bumpers are provided only on the upper end of the inner sleeve and the lower end of the outer sleeve, inasmuch as the mounting is intended to act as a support for a member mounted on the inner sleeve and, consequently, the principal forces are acting in a downward direction on the inner sleeve and an upward direction on the outer sleeve. It will be appreciated that the bumper rings or flanges may both be formed in the manner of the flange 15 in Figure 1, or, as shown in Figure 2, the flange 15a on the outer sleeve may be formed as a press-fitted ring. Where the mounting is to sustain forces which act substantially equally in opposite directions, bumpers, such as the bumpers 14 and 15a in Figure 3, are provided on both ends of both sleeves.

Due to tolerances in the outside diameter of the inner sleeve, the inside diameter of the outer sleeve and in the size of the rubber ring in its free state, it is found that there are unavoidable variations in the axial extent of the distorted rubber ring 10 in the finally assembled mounting. These variations result in a variation between the deflection of different mountings under a given load. In addition, unavoidable and minor variations in the composition or hardness of rubber likewise result in different deflection rates for different mountings which are otherwise apparently identical.

In accordance with the present invention, these variations are corrected and a plurality of mountings having identical deflection characteristics is readily produced by adjusting the position of one or more of the bumper rings of the mounting after the rubber ring is inserted between the two sleeves. The effect of such adjustments is best illustrated in the chart, Figure 9, in conjunction with the fragmentary illustrations in Figures 4 to 6, inclusive.

Figure 9 shows a graph of axial force acting upon one of the sleeves plotted against the axial deflection of that sleeve with respect to the other sleeve. The axial deflection curve for any given mounting varies widely in form, depending upon the proportions of the various parts, but the curves illustrated in Figure 9 are generally representative of the nature of the changes in deflection rate that can be achieved by adjusting the position of the bumper rings. The lowermost curve 20 represents the deflection curve of a mounting of the type mentioned when no bumpers are employed. If after assembly a bumper ring, such as the ring 21 in Figure 4, is press-fitted on the inner sleeve 11 by means of the plunger 22 of a suitable press until the ring assumes the position shown in Figure 4, in which it is spaced slightly from the end of the rubber ring 10, the deflection curve for the mounting will be for a portion of its length identical to the mounting having no bumpers, but after the rubber contacts the bumper ring the resistance to deflection will increase, with the result that the deflection curve will assume a form somewhat like that shown at 24 in Figure 9.

By pressing the bumper ring 21 onto the inner sleeve until it just touches the rubber ring 10, as shown in Figure 5, a deflection curve represented by the line 25 in Figure 9 may be secured. The stiffness of the mounting may be further increased, with the result that it has a deflection curve such as that illustrated at 26 in Figure 9, by forcing the abutment ring 21 to a further extent onto the inner sleeve 11, as best shown in Figure 6. It will be apparent, therefore, that it is possible to increase or decrease the stiffness of any given mounting by adjusting the position of the bumper, as above described, over a much wider range than the unavoidable variations in stiffness which result from tolerances of manufacture.

The deflection resistance may be either increased or decreased, depending upon the direction in which the bumper is shifted, but, inasmuch as it is somewhat easier to move the bumper toward the rubber, it is preferred to design and construct the mountings to have resistance to deflection for their rated load slightly less than that desired in the final mounting. In such case, as a last step in the manufacture, one or more of the bumpers is adjusted in position to increase the stiffness of the mounting to the degree necessary to produce a mounting of the desired deflection characteristic.

For some purposes, where it is determined that the desired deflection characteristic can be achieved with the required accuracy by adjusting the flange until it just contacts the end of the rubber ring, it is possible to carry out the method in an ordinary hand-operated or manually controlled mechanical press which will force a press-fitted ring onto one of the mounting members until the desired relationship is achieved. The operator may, by inserting a very thin feeler gauge between the end of the rubber and the bumper, ascertain when the bumper has just contacted the rubber. If a slight space between the rubber and the bumper is desired, a feeler gauge of appropriate thickness can be employed and the pressing operation stopped when the bumper reaches the desired position.

In Figure 7 is illustrated a fixture for determining the proper location of a bumper particularly adapted for use in cases where the bumper is forced into the body of rubber, as indicated in Figure 6, to produce a stiffness represented by the line 26 on Figure 9. In Figure 7 numeral 30 represents the bed of an ordinary press having a plunger 31 adapted to force the abutment ring 32 onto the inner sleeve 11 of the mounting. Mounted on the bed 30 of the press is an upright post 33 having a hinged section 34 at its upper end, upon which is mounted a conventional form of dial indicator of the type commonly used for indicating minute dimensional variations. An arm 36 pivoted at 37 on the member 34 underlies the plunger 38 of the dial indicator and has a downwardly bent extremity carrying a button 39, which rests upon the upper end of the rubber ring 10 of the mounting. As a result of this arrangement, as the bumper ring 32 is forced downwardly beyond the point at which it first contacts the rubber ring 10 it will cause an upward flow or extrusion of the rubber in the manner illustrated in Figure 6, which will tend to lift the button 39 and lever 36, thereby raising the plunger 38 of the indicator and causing the pointer of the indicator to traverse the dial, thereby giving an indication of the amount which the upper end of the rubber ring has been elevated. By stopping the operation of the press after the rubber ring has been elevated by a predetermined amount, it is possible to obtain mountings of relatively uniform deflection characteristics.

The fixture illustrated in Figure 7 may also be employed in the same manner in connection with mountings in which the bumper is an integrally formed flange on one of the sleeves. Thus, in the case of such a mounting illustrated in Figure 8, the inwardly bent flange 42 on the inner sleeve 43 may be bent downwardly to a greater extent by means of a die 44 of appropriate shape which is mounted upon the plunger of the press. The die 44 has a stem 45 which will project entirely through the inner tubular member 43 before any deformation of the flange 42 occurs, thus preventing collapse of the inner tubular member, which is supported on a support 46. The operator, as in the case of the mechanism illustrated in Figure 7, will cause the die 44 to move downwardly until the upward extrusion of the rubber ring reaches the predetermined amount, as indicated by the dial indicator of Figure 7.

In Figure 10 is illustrated a mechanism for adjusting a bumper to the desired point for use in cases where it is necessary to produce mountings whose deflection rates are very accurately calibrated. In this mechanism control means are provided which give a direct reading of the amount of deflection under a rated load throughout the bumper moving operation, thus enabling the operator to stop the machine when the deflection reaches the desired value.

Referring to Figure 10, the mechanism comprises a U-shaped frame 50, the lower leg 51 of which forms the base of the machine and the upper leg 52 of which supports a hand-operated screw press. While the mechanism of the press may take any suitable or conventional form, there is shown, for purposes of illustration, a press comprising a hand wheel 53, the hub of which is threaded upon a threaded arbor 54 the upper end of which is reduced at 55 and fitted within an opening 56 in the upper leg 52 of the frame. Any suitable means may be provided for fixing the stem of the arbor 54 in the opening 56 against movement relative to the frame.

Mounted on the lower side of the hub of hand wheel 53 is a thrust bearing assembly comprising a pair of plates 57 and 58 separated by roller bearings and held in assembled relation by means of a housing 59, which is fixed at its upper end to the hub of the hand wheel. The lower face of the plate 58 is provided with a recess 60 adapted to receive the annular bumper 61, which is to be press-fitted on the inner sleeve 11 of the mounting. A ring of rubber 62 may be provided within the recess 60 to grip the bumper 61 and hold it in position prior to the press-fitting operation. In some cases it may be preferred to start the press-fitting operation in another press and complete the operation in the machine of Figure 10. In that case the bumper will be on the sleeve 11 when the mounting is placed in the machine and it will be unnecessary to provide the recess 60 or its rubber ring 62.

The threaded arbor 54 is provided with a central bore 63 having a countersunk enlargement 64 in its lower end. Positioned within the countersunk enlargement 64 is a clamping plunger 65 which projects freely through suitable openings in the plates 57 and 58 of the thrust bearing and is adapted to pass freely through the bumper ring 61. The lower end of the plunger 65 is provided with a rounded pilot projection 66, which is adapted to enter the upper end of inner sleeve 11 and bring the sleeve into proper alignment with the plunger 65. The annular shoulder 67 on the lower end of the plunger 65 is adapted to abut the upper end of the sleeve 11 and hold the sleeve against its lower support, hereinafter described.

Plunger 65 is connected to a rod 68, which passes through the bore 63 in the arbor 54 and carries at its upper end a nob or handle 69. The upper end of the reduced portion 55 of the arbor is split and provided with a pair of projecting ears 70 and 71, as best shown in Figure 12. A bolt 72 passes through the ears 70 and 71, and threaded on the opposite end thereof is a nut 73 carrying a handle 74 for rotating the same. The arrangement is such that when the handle 74 is raised into the dotted line position shown in Figure 10 the rod 68 will be released, thereby permitting the rod and its attached plunger 65 to drop by gravity into the lower dotted line position shown by Figure 10, in which position the pilot line 66 has entered the sleeve 11 and the plunger is resting on the top edge of the sleeve. In this position, the rod 68 may be clamped by pulling the handle 74 downwardly into the solid line position illustrated. When the plunger and rod 68 are in their upper positions, they may also be held against downward movement by shifting the handle 74 to its lower position, thereby clamping the rod 68 within the split upper end of the reduced portion 55 of the arbor.

The outer sleeve 12 of the vibration mounting is adapted to rest upon an annular ring 80, which is pivotally mounted on a lever 81, which, in turn, is journaled on a pin 82 carried by the base portion 51 of the frame. Roller bearings 83 are preferably employed at this pivot to reduce friction. The pivotal connection between the ring 80 and the lever 81 is of such character as to permit limited pivotal movement of the ring 80 with reference to the lever 81 about an axis perpendicular to the paper in Figure 10 and intersecting the axis of the mounting. This pivotal connection comprises a pair of projections 84 projecting inwardly from opposite sides of a circular opening 85 of lever 81 within which the ring 80 is positioned. The upper surfaces of the projections 84 are V-shaped, as best shown in Figure 12, and are thus adapted to act as fulcrums for the ring 80. The ring 80 is provided with a pair of inverted U-shaped projections 86 having the notches 87 adapted to receive the fulcrums 84. The internal angle of the V notch 87 is slightly greater than the internal angle of the V-shaped projection on the fulcrum 84, with the result that a limited pivotal movement of the ring 80 with respect to the lever 81 is permitted.

The lever 81 projects to the left of its pivot 82 and at its extremity carries a pivoted rod 90 adapted to support a plurality of weights 91 of the type frequently employed in weighing scales.

The right-hand extremity of the lever 81 is connected by means of a turnbuckle linkage 92 to a pointer 93, which is pivoted at 94 on the frame 50 and is adapted to move over a scale 95. Means are provided for holding the lever 81 against movement in response to the force exerted by the weights 91. This means comprises a shaft 96 journaled on the frame portion 51 and having fixed thereto a member 97 having a projection 98, which, in the rotative position of the shaft illustrated in the drawings, engages beneath the left-hand end of the lever 81 and holds that end of the lever against downward movement in response to the force exerted by the weights. A handle 99 fixed to the shaft 96 is provided for moving the projection 98 out of contact with the lever 81 and thus permitting the weights to take effect. The turnbuckle 92 is so adjusted that the pointer 93 is on the zero point of the scale 95 when the stop 98 engages the left-hand end of lever 81.

The lower end of the inner sleeve 11 of the mounting projects through the central opening in the ring 80 and is adapted to engage a cylindrical supporting element 102, which is slidable within a cylindrical opening 103 carried by the frame portion 51. Beneath the cylindrical supporting member 102 is located a horizontal shaft 104 journaled in the frame portion 51 and carrying an eccentric cam 105, which is adapted to engage the lower end of the cylindrical supporting member 102. A handle 106 is fixed to the shaft 104 and carries a weight 107, which is adjustable along the length of the handle in any suitable manner, as by a set screw 108, which may be threaded into engagement with the handle at the point it passes through an opening in the weight 107. The arrangement of the weighted handle and the eccentric cam is such that when the handle 106 is shifted to the left, as shown in solid lines in Figure 10, the upper end of the cylindrical support 102 is out of contact with the lower end of the inner sleeve 11. When the handle is swung counterclockwise about the shaft 104, the eccentric cam 105 elevates the cylindrical support 102 into contact with the lower end of the sleeve 11. The weight 107 is so adjusted on the handle 106 that it will exert sufficient turning force to elevate the cylindrical member 102 into engagement with the sleeve 11. The angle of the cam 105 is such that no amount of force exerted on the top of the cylindrical member 102 will cause the cam to rotate in a direction to lower the member 102.

The sliding support 102 and the eccentric cam and handle arrangement are provided solely for the purpose of automatically compensating for unavoidable variations in the distance between the lower end of the outer sleeve 12 and the lower end of the inner sleeve 11 of the mounting. If this distance in the manufacture of mountings is accurately maintained at the same value, the supporting member 102 may be fixed in such a position that it will just contact the lower end of the sleeve 11 when the outer sleeve rests on the ring 80 and the stop 98 is engaged below the left-hand end of lever 81. In this case, the eccentric cam and handle for operating the same may be omitted and the support 102 may be fixed in the desired position.

The operation of the mechanism shown in Figures 10 to 13 is as follows: With the parts of the machine in the solid line positions illustrated, a mounting is placed upon the annular ring 80 in the position shown and the handle 74 raised to release the rod 68 and permit the plunger 65 to fall by gravity into contact with the upper end of sleeve 11. As soon as this has been achieved, handle 74 is lowered to lock the plunger 65 in position. The weight of the plunger and rod 63 is not sufficient to cause any significant axial deflection of the inner sleeve relative to the outer sleeve of the mounting. As soon as the plunger 65 is clamped in its lower position, the lever 106 is swung counterclockwise toward the dotted line position in order to elevate the supporting member 102 into engagement with the lower end of the inner sleeve 11. This positively locks the inner sleeve 11 in a fixed position. Stop 98 is then moved out of contact with the left-hand end of lever 81 by swinging handle 99 counterclockwise, thus permitting the force exerted by the weights 91 to exert a counterclockwise rotative force upon the lever 81. The only resistance to such rotation of the lever 81 at this time will be the resistance offered by the rubber ring 10 positioned between the sleeves 11 and 12 of the vibration mounting and, consequently, the lever 81 will rotate by an amount which accurately measures the axial deflection between the sleeves incident to the axial load applied by means of the weights 91 and the lever 81 to the lower end of the sleeve 12. The amount of this deflection will be indicated by the position of the pointer 93 on the scale 95. This deflection will purposely be slightly greater than that desired and, consequently, the pointer will assume a dotted line position at a point on the scale above that marked by the adjustable indicator 110, which is set at the desired deflection for the load employed. The operator is now ready to begin the operation of pressing the annular bumper 61 onto the inner sleeve 11, which operation is accomplished by rotating the hand wheel 53, thereby forcing the plate 57 of the thrust bearing downwardly and causing the ring 61 to be press-fitted onto the upper end of the sleeve 11. As the operator continues the pressing operation he observes the pointer 93 and the operation is stopped at the instant that the pointer reaches the point on the scale marked by the adjustable slide 110. All of the parts of the machine may be then returned to their original positions in the reverse order and the mounting removed from the machine. The mounting will then be complete except that it will usually be necessary to trim off an excess projection on the bumper ring 61 in order to produce a flush end on the inner sleeve 11.

While the machine illustrated in Figure 10 is constructed for use in press-fitting separate abutment sleeves on the inner sleeve of the mounting, it will be apparent that it may be readily adapted to press an abutment ring on the outer sleeve. Moreover, in place of pressing the separate abutment ring on one of the sleeves of a mounting, the machine may be equipped with a die similar to the die 44 in Figure 8 for the purpose of changing the position of an integral abutment flange on either of the sleeves. In this case, the stem 45 of the die 44 in Figure 8 will be substituted for the plunger 65 of Figure 10, and the flange bending portion of the die will be made as a separate annular piece secured to the plate 58.

In Figure 14 is illustrated a hydraulically operated mechanism generally similar to that illustrated in Figure 10 but employing an external source of hydraulic power for its operation. In this machine the control means may either operate an indicator which will indicate to the operator when the machine should be stopped, or it may, as shown in Figure 15, automatically stop the machine when the deflection characteristic of the mounting reaches the desired value.

The machine of Figure 14 includes a generally U-shaped frame 120, which, as illustrated is of hollow cast construction. Pivoted on a pin 121 fixed to the frame 120 is a lever 122 similar in construction and operation to the lever 81 of Figure 10. The left-hand end of lever 122 is pivotally connected to a rod 123, which supports a plurality of weights 124.

To the right of pivot 121 lever 122 pivotally supports a ring 125, which is similar in construction and mode of operation to the ring 80 of Figure 10 and which is adapted to support a vibration mounting of the type under consideration by engagement with the lower end of the outer sleeve 12 of the mounting. The inner sleeve 11 of the mounting projects through a central opening in the ring 125 and is adapted to engage a cylindrical supporting element 126, which rests upon a spiral cam 127 pivoted on a shaft 128 carried by the frame.

Fixed to the cam 127 is a lever 129, which is normally urged upwardly by a light spring 130. The spring 130 has sufficient strength to raise the lever and thereby elevate the cylindrical supporting element 126 into contact with the lower end of the sleeve 11, but is not sufficiently strong to lift the mounting from its position resting upon the ring 125.

The right-hand end of the lever 122 projects through an opening 134 formed in the inner side of the upright portion of the frame 120 into the interior of the hollow upright portion, and within the hollow frame it is connected by means of a turnbuckle link 135 to a pointer 136, which is pivoted between a pair of ears 137 formed on the frame at opposite sides of the opening 134. The pointer 136 is adapted to cooperate with a scale 138 having an adjustable indicator 139 associated therewith. At the left-hand side of the machine a hand lever 140 is fixed to the shaft 141, which, in turn, is journaled on the lower portion of the frame 120. The shaft 141 carries a stop 142 which engages beneath the left-hand end of the lever 122 and holds the lever against counter-clockwise movement in response to the force exerted by the weights 124. The arrangement of the stop 142 is such that it does not release the lever 122 until after the handle 140 has been swung counterclockwise through an arc sufficient to actuate the plunger operating mechanism hereinafter described.

Formed integrally with the upper portion of the frame 120 is a cylinder 144 having an integrally formed upper end wall 145 and a removable cylinder head 146. A hollow piston rod 147 extends through both ends of the cylinder and carries an integrally formed piston 148. The upper end of the cylinder is provided with any suitable or conventional form of packing gland 149 and a fluid inlet pipe 150. A spring 151 is provided within the cylinder for urging the piston 148 upwardly at all times, the spring being strong enough to elevate the piston and discharge the fluid in the upper end of the cylinder when the inlet 150 is connected to the low pressure return line, as hereinafter more fully described.

The lower end of the hollow piston rod 147 is threaded to receive a ring 152, which is provided with a counterbore 153 at its lower end adapted to receive an abutment ring 154 similar to the ring 61 of Figure 10 and ring 21 of Figures 4 to 6. The counterbore 153 is larger in diameter than the ring 154 and is provided with a ring 155, of rubber or the like, which serves to frictionally hold the ring 154 in position within the counterbore. As in the previous machine, if the ring 154 is partially pressed on the sleeve 11 prior to the final adjustment made in the machine of Figure 14, the counterbore 153 and the ring 155 may be omitted.

Mounted within the hollow piston rod 147 is a plunger 156, to the lower end of which is removably secured a head 157 having a rounded end portion 158 adapted to fit within the upper end of the inner sleeve 11 of the vibration mounting and align the mounting with the ring 154. The outer diameter of the plunger head 157 is substantially equal to the internal diameter of the ring 154, but will pass freely through the latter.

The machine may be adapted to operate upon abutment rings of various sizes by removing the ring 152 and the plunger head 157 and substituting a ring and plunger head of suitable dimensions.

The upper end of the plunger 156 is provided with an ear 160 carrying a transverse pin 161, which projects into the slightly elongated slot 162 in the end of a lever 163. The lever 163, in turn, is pivotally mounted upon a transverse pin 164, which extends between a pair of upstanding ears 165 on the upper portion of the frame 120.

The right-hand end of the lever 163 is provided with a generally downwardly extending cylindrical bore 166 containing a plunger 167 having a semispherical recess 168 in its lower end adapted to receive a piston rod 169, the lower end of which is seated within a semispherical recess 170 in the bottom of a sleeve-type piston 171 fitted within an upwardly opening cylinder 172 formed integrally with the frame 120. A set screw 174 is provided for adjusting the position of the plunger 167 in order to adjust the position of plunger 156 with reference to the piston 171.

A helical compression spring 175 is positioned between a downwardly projecting arm 176 on the lever 163 and a seat 177 formed integrally with and extending between the upstanding ears 165 of the frame 120. The action of the spring 175 is to urge the lever 163 at all times in a clockwise direction and thus keep the piston rod 169 in a state of compression between the plunger 167 and the piston 171. The lower end of the cylinder 172 is provided with a fluid inlet pipe 180 for admitting operating fluid to the cylinder and the spring 175 is sufficiently strong to return the cylinder 172 to its lowermost position and discharge the fluid in the cylinder when the inlet 180 is connected to the low pressure return line, as hereinafter described.

Any suitable hydraulic control mechanism may be employed to control the admission of fluid to cylinders 172 and 144. The particular means illustrated is adapted to operate these cylinders in succession, and their operation is correlated with the withdrawal of the stop 142 to the end that the stop will be withdrawn after the cylinder 172 and before cylinder 144 are operated. This means, as best shown in the drawings, comprises a pair of valves 182 and 183 which is mounted upon a panel 184 fixed in any suitable manner to the left-hand side of cylinder 144. Valves 182 and 183 are conventional valves of the type employing an internal rotary valve member mounted upon a stem which projects from the valve housing.

The stem 185 of valve 183 carries a V-shaped operating member 186 having a pair of fingers 187 and 188 extending at an angle of approximately 90° to each other. The stem 190 of valve 182 carries a similar V-shaped operating member 191 having fingers 192 and 193. The panel 184 with the two valves and their operating members 186 and 190 are located to the rear of the plane of movement of the operating handle 140, as viewed in Figure 14, the handle being broken away to show the valves.

Valve 182 controls the operation of cylinder 172, to which it is connected by means of a pipe or conduit 194 that extends from the valve to the inlet port 180 of the cylinder. Similarly, valve 184 controls the operation of cylinder 144, to which it is connected by means of pipe or conduit 195 that is connected to the inlet port 150 of cylinder 144. The pipe 197, which is connected to any suitable source of fluid under pressure, not illustrated, is connected to the valve 182 and by a branch line 198 to the valve 183.

An exhaust or return line 200, which is connected to any suitable low pressure reservoir of fluid, is also connected to the valve 182 and, by a branch line 201, to the valve 183. The construction of the valve 182 is such that when the stem 190 and the stem operating member 191 are in the position illustrated in Figure 14, communication through the valve is provided between pipe 200 and pipe 194 while the pressure line 197 is blocked at the valve 182. When the stem 190 is rotated counterclockwise through an angle in the order of 90°, the valve connects pressure line 197 to conduit 194 and the line 200 is blocked at the valve. Valve 183 is identical in construction, and in the position illustrated it connects pipes 201 and 195 while blocking line 198. When the stem 185 is rotated counterclockwise approximately 90°, valve 183 connects lines 198 and 195 while blocking line 201.

Valves 182 and 183 are operated by a finger 203 carried by an arm 204 which projects rearwardly from and is fixed to the handle 140, with the result that the downwardly extending finger 203 lies in the plane of the valve operating members 186 and 191. As a result of this arrangement, when the handle is shifted to the right into its stop position illustrated, finger 203, by engaging fingers 188 and 193 of the valve operating members 186 and 191, shifts both valves to the positions illustrated in which they connect both cylinders to the low pressure return line.

When the handle is shifted to the left, as viewed in Figure 14, finger 203 will first contact finger 192, thus shifting the valve 182 to a position in which it connects cylinder 172 to the pressure line 197. Thereupon, further movement of the handle 140 to the left will cause the finger 203 to engage the finger 187 and shift valve 183 to a position in which it connects cylinder 144 to the pressure line 197. The stop 142, which is also movable with the handle 140, is so positioned that it will release lever 122 intermediate the shifting of valves 182 and 183 during counterclockwise movement of the handle 140.

In order to provide a slow downward movement of the piston 148 without affecting the speed of return movement of the piston, any suitable form of throttle or speed control valve, such as the valve indicated diagrammatically at 206, may be employed in the pressure line 197. Valve 206, by throttling the flow of fluid under pressure, will cause the piston 148 to move slowly in a downward direction, but since the return line 200 is not restricted the return movement of the piston 148 under the influence of spring 151 will be rapid.

The operation of the mechanism shown in Figure 14 is as follows. The operator, after inserting the abutment ring 154 within the recess in ring 152 with his right hand, places his right hand on lever 129, thus forcing it downwardly against spring 130, and at the same time rests the vibration mounting on the ring 125.

As soon as the mounting is in place, the operator's right hand is removed from the lever 129, thus permitting the spring 130 to lift the lever and raise the cylindrical supporting member 126 into contact with the lower end of the inner sleeve 11. The operator then with his left hand swings the handle 140 to the left, which movement first shifts valve 182, thus admitting fluid under pressure to cylinder 172 and causing the plunger 156 with its head 157 to move downwardly. The rounded pilot end 158 on the head 157 enters the upper end of the inner sleeve 11 and thus properly locates the sleeve in alignment with the abutment ring 154. To facilitate this action the permissible pivotal movement of ring 125 relative to lever 122 is not sufficient to permit the upper end of the mounting to tilt so far that the pilot 158 cannot enter sleeve 11. Continued movement of the handle 140 to the left withdraws the stop 142 from beneath the lever 122 and thereafter shifts valve 183 to permit fluid under pressure to enter the upper end of cylinder 144, thus causing the piston 148, ring 152 and the abutment sleeve 154 to move downwardly and press fit the abutment ring upon the upper end of sleeve 11.

The arrangement of the stop 142 is such that it holds the lever 122 in such a position that the pointer 136 is at the zero point on the scale 138. When the supporting cylinder 126 is elevated by lever 129 into contact with the lower end of sleeve 11, member 126 constitutes a fixed support which positively rotates the sleeve 11 in such a position that at no load on the outer sleeve 12 will the pointer 136 remain at the zero position on the scale 138.

When the plunger 156 moves downwardly against the upper end of sleeve 11, the force exerted by the plunger cannot cause a downward movement of the supporting member 126 because the angle of the cam 127 is insufficient to permit a return movement. Consequently, when the lever 122 is released and the load induced by weights 124 applied to the outer sleeve 12 of the mounting, the pointer 136 will move upwardly on the scale 138 and accurately indicate the total axial deflection of the sleeve 12 under the influence of the force applied. As previously indicated, this deflection, in the normal case, will be slightly in excess of that desired and, consequently, the operator will permit the downward movement of the piston 148 until the pointer 136 swings downwardly to the point indicated by the adjustable slide 139 on the scale 138, the position on the slide indicating the desired deflection.

As soon as the pointer reaches this position, the handle 140 is swung to the right, thus shifting valve 183 and connecting the upper end of the cylinder 144 to the low pressure return line 200. This immediately results in the return of the piston 148. Continued movement of the handle 140 to the right shifts the stop 142 into position beneath the lever 122, thereby raising the lever and relieving the load upon the mounting.

The final movement of the handle 140 to the right connects cylinder 172 to the low pressure line 200, thereby permitting the spring 175 to elevate the plunger and release the mounting. The parts are then in position to repeat the cycle of operation as just described on another mounting.

As previously indicated in connection with the mechanism of Figure 10, the mechanism of Figure 14 may also be employed to shift the position of integral abutment flanges, such as those illustrated in Figure 8. It is only necessary to connect the spindle 45 on the die 44 of Figure 8 to the plunger 159 and to connect the outer annular portion of the die 44, which will be a separate annular piece, to the hollow piston rod 147.

The left-hand end of the frame 120 is provided with a wall 210 having an internal vertical surface 211, which is adapted to engage the lower end 112 of the handle 140 in order to limit movement of the handle in a clockwise direction to the position illustrated in the drawings. The upper portion of the wall 210 is provided with an inclined surface 113 for limiting counterclockwise movement of the handle 140.

It will be appreciated that the details of construction of the mechanism may be varied widely without departing from the spirit of the invention. Thus, instead of employing springs to return the pistons 148 and 170, the cylinder and piston units may be made double-acting under the control of four-way reversing valves of conventional construction. In addition, the hydraulic control mechanism may incorporate any conventional form of means for giving the piston 148 on its downward stroke a high speed for the initial portion of the stroke and a low speed for the final portion, during which the press-fitting operation is performed.

In order to adjust the machine to accommodate mountings of different axial length, it is only necessary to insert suitable spacers between the outer sleeve 12 and the ring 125, or, if preferred, the vertical portion of the frame 120 may be made adjustable as to height in order to accommodate mountings of different lengths.

As previously indicated, the control means, instead of indicating to the operator when the mounting has the desired deflection characteristic, may automatically stop the machine and, accordingly, there is illustrated in a somewhat diagrammatic manner in Figure 15 a suitable electromagnetic means which may be incorporated in the machine of Figure 14 to accomplish that result.

Referring to Figure 15, there is shown a valve 183' which is substituted for the valve 183 of Figure 14 when automatic operation is desired. Valve 183 contains a spool 210 having a groove 211 for controlling flow of fluid through the valve. To the valve are connected the previously mentioned line 197 from a source of fluid under pressure and the line 200, which is a return line to a low pressure tank or reservoir. The spool 210 is normally held in its lower position illustrated in the drawings by means of a spring 212, but is shifted upwardly upon energization of a solenoid, indicated diagrammatically at 213. When the valve is in the position illustrated, line 195, which leads to the upper end of cylinder 144, is connected through the groove 211 to the low pressure return line 200. When the solenoid is energized and the spool elevated against the force of spring 212, communication between lines 195 and 200 is blocked and the fluid is free to flow from line 197 to line 195 in order to cause downward movement of the piston 148 of Figure 14.

The electrical energy for actuating the solenoid 213 is supplied from any suitable source of electric power by a pair of lines 214 and 215, line 214 being directly connected to one end of the solenoid coil and line 215 being connected to the other end through a switch 216, line 217, a switch 218 and line 219. Switch 216 comprises a movable switch element which is operatively connected in any suitable manner to the rotary shaft 185', which corresponds to the shaft 185 in the machine of Figure 14 and is operated in the same manner by means of the control handle 140 to close switch 216 when the handle 140 is shifted to its extreme left-hand position.

When the switch 216 is closed the circuit through the solenoid 213 is closed, thus energizing the solenoid and effecting a shift of the spool of valve 183' to its upper position, in which it blocks the return line 200 and connects line 197 to line 195 and thereby starts the downward or bumper moving stroke of the piston 148. During this operation the switch arm 218, which connects lines 217 and 219, is held closed by means of a spring 220.

Means are provided for opening switch 218 and thereby interrupting the circuit through the solenoid 213 when the deflection characteristic of the mounting reaches the desired amount. This means includes a solenoid 221 having an armature 226 which projects entirely through to the coil of the solenoid. The armature 226 is operatively connected to the switch 218 and the lower end of the armature 226 carries a bar 227, which is adapted upon downward movement of the armature to close an electric circuit between a pair of contacts 228 and 229. The circuit for the solenoid 221 includes a line 222, which connects to line 217, and a line 223, which is connected to the pointer 136', which corresponds to the pointer 136 of Figure 14.

The pointer in this case is made of electrically conductive material. An arcuate member 138' carries an adjustable slide 139' upon which is positioned a contact 224 adapted to cooperate with a contact 225 on the pointer 136'. The member 138' corresponds to the scale 138 of Figure 14, and the slide 139' corresponds to the adjustable indicator 139. The arcuate member 138' is electrically connected by means of a wire 231 to the line 214.

When the pointer 136' swings to a position in which the contact 225 engages the contact 224, it is apparent that the circuit through the solenoid 221 is completed from line 222 through the solenoid and thence through line 223, pointer 136', contacts 225 and 224, members 138' and 139' and line 231 to the line 214. The circuit thus completed energizes the solenoid and causes the armature 226 to move downwardly, opening switch 218 and engaging the bar 227 with the contacts 228 and 229. As soon as switch 218 is opened, the current is interrupted at the main solenoid 213 and the spool of valve 183' returns to the position shown in the drawings, thus stopping the operation of the press.

The contacts 228 and 229 and the bar 227 provide a holding circuit to insure that once the solenoid 221 is energized by engagement of contacts 224 and 225, it will remain energized until the manual switch 216 is opened. Thus, contact 228 is connected to the line 223 and contact 229 is connected to the line 214. As a result of these connections, current from the solenoid 221 may flow through line 230, contact 228, bar 227, contact 229 and line 231 to the line 214, even though the contacts 224 and 225 do not remain in engagement.

The operation of the machine of Figure 14, when it incorporates the automatic shut-off mechanism of Figure 15, is believed to be apparent from the above description. It may be noted that as in the case of the operation described in connection with Figure 14, the machine is started by swinging handle 140 to the left. The first portion of this movement, as previously described, shifts valve 182 to actuate the clamping plunger 156. Thereafter, further movement of the handle 140 withdraws the stop 142 and the final movement closes the switch 216. Between the time that the stop 142 is removed and the time that the switch 216 is closed by handle 140, the load will be applied to the sleeve 12 of the mounting, thus causing the pointer 136' to swing upwardly until its contact 225 is located above the contact 224. During the passage of contact 225 over the contact 224, solenoids 213 and 221 will remain inactive due to the opening circuit of switch 216. Thereafter, as soon as switch 216 is closed, solenoid 213 will shift valve 183' and start the operation of the press, which operation will continue automatically until interrupted by the solenoid controlled switch 218, which is actuated when the deflection characteristic of the mounting reaches the predetermined amount.

It is apparent that there is provided in accordance with the present invention simple and practical methods and apparatus for producing vibration mountings of accurately calibrated deflection characteristics. While the invention is illustrated and described in connection with mountings of the type employing a pair of concentric rigid members, it will be appreciated that the principles of the invention are equally applicable to any type of vibration mounting incorporating a pair of rigid members separated by a layer of resilient rubber.

It is apparent, further, that while several mechanisms are illustrated and described, further modifications of the mechanisms are available within the spirit of the invention and the scope of the appended claims.

What I claim is:

1. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a plunger mounted on the frame over said plate for clamping the inner concentric member against the supporting element, a vertically-reciprocable member outside of said plunger for progressively moving a bumper axially on one of the concentric members and against the annular ring of rubber, said plunger being moveable relative to said vertically-reciprocable member, a deflection indicating mechanism for indicating the axial displacement of the outer concentric member, and a stop for preventing extreme rotation of said lever about its pivot point.

2. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a cam mounted on said frame in turn supporting said supporting element provided with means for rotating said cam to raise said supporting element to compensate for variations in the distance between the bottoms of the inner and outer concentric members in the unloaded condition, a plunger mounted on the frame over said plate for clamping the inner concentric member against the supporting element, a vertically-reciprocable member concentric with the axis of said plunger for progressively moving a bumper axially on one of the concentric members and against the annular ring of rubber, said plunger being moveable relative to said vertically-reciprocable member, a deflection indicating mechanism mounted between said frame and said lever for indicating the axial displacement of the outer concentric member, and a stop for preventing extreme rotation of said lever about its pivot point.

3. An apparatus for positioning a bumper flange on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a cam mounted on said frame in turn supporting said supporting element provided with means for rotating said cam to raise said supporting element to compensate for variations in the distance between the bottoms of the inner and outer concentric members in the unloaded condition, a plunger mounted on the frame over said plate for clamping the inner concentric member against the supporting element, a vertically-reciprocable member concentric with the axis of said plunger for progressively moving a bumper flange axially on one of the concentric members and against the annular ring of rubber, said plunger being moveable relative to said vertically-reciprocable member, said vertically-reciprocable member being provided with a die for engaging said bumper flange, a deflection indicating mechanism mounted between said frame and said lever for indicating the axial displacement of the outer concentric member, and a stop for preventing extreme rotation of said lever about its pivot point.

4. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a cam mounted on said frame in turn supporting said supporting element provided with means for rotating said cam to raise said supporting element to compensate for variations in the distance between the bottoms of the inner and outer concentric members in the unloaded condition, a hydraulically-operated plunger mounted on the frame over said plate for clamping the inner concentric member against the supporting element, a hydraulically-operated, vertically-reciprocable member concentric with the axis of said plunger for progressively moving a bumper axially on one of the concentric members and against the annular ring of rubber, said plunger being movable relative to said vertically-reciprocable member, a deflection indicating mechanism mounted between said frame and said lever for indicating the axial displacement of the outer concentric member, a removable stop for preventing extreme rotation of said lever about its pivot point, and a single manual control element movable in one direction to successively actuate said hydraulically-operated plunger, remove said stop, and actuate said hydraulically-operated, vertically-reciprocable member.

5. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a cam mounted on said frame in turn supporting said supporting element provided with means for rotating said cam to raise said supporting element to compensate for variations in the distance between the bottoms of the inner and outer concentric members in the unloaded condition, a hydraulically-operated plunger mounted on the frame over said plate for clamping the inner concentric member against the supporting element, a hydraulically-operated, vertically-reciprocable member concentric with the axis of said plunger for progressively moving a bumper axially on one of the concentric members and against the annular ring of rubber, said plunger being movable relative to said vertically-reciprocable member, a deflection indicating mechanism mounted between said frame and said lever for indicating the axial displacement of the outer concentric member, a removable stop for preventing extreme rotation of said lever about its pivot point, control means for said hydraulically-operated plunger and vertically-reciprocable member, and a solenoid-controlled switch responsive to the deflection of the deflection indicating mechanism to stop the operation of the vertically-reciprocable member when the deflection characteristic of the mounting reaches a predetermined point.

6. An apparatus for positioning a bumper on one of the members of a vibration mounting of the type consisting of inner and outer concentric radially spaced members separated by an annular ring of rubber to produce a mounting having a predetermined deflection for a given load comprising a frame, a substantially horizontal lever pivotally mounted intermediate its ends on said frame and provided with an opening on one side of the pivot point, a weight pivotally suspended from said lever on the other side of said pivot point, a plate horizontally pivoted in said opening on said lever with the pivot axis of said plate being parallel to the pivot axis of said lever, said plate being adapted to support the outer concentric member and provided with a central opening, a supporting element in alignment with the central opening of said plate and providing support for the inner concentric member, a cam with an increasing radius horizontally pivoted on the frame in turn supporting said supporting element, a handle integral with said cam and extending out substantially horizontally from the thicker portion of the cam, a compression spring disposed out from said cam between said handle and said frame, a plunger mounted on the frame over said plate for clamping the inner concentric member against the supporting element, a vertically-reciprocable member concentric with the axis of said plunger for progressively moving a bumper axially on one of the concentric members and against the annular ring of rubber, said plunger being moveable relative to said vertically-reciprocable member, a deflection indicating mechanism mounted between said frame and said lever for indicating the axial displacement of the outer concentric member, and a stop for preventing extreme rotation of said lever about its pivot point.

LEON F. THIRY.

References Cited in the file of this patent

UNITED STATES PATENTS

| Number | Name | Date |
| --- | --- | --- |
| Re. 18,843 | Skillman | May 30, 1933 |
| 207,245 | Britton | Aug. 20, 1878 |
| 376,541 | Mergenthaler | Jan. 17, 1888 |
| 440,938 | Anthoni | Nov. 18, 1890 |
| 493,784 | Reeser | Mar. 21, 1893 |
| 1,734,025 | Zeibig | Oct. 29, 1929 |
| 1,827,267 | Short | Oct. 13, 1931 |
| 1,913,933 | Lamborn et al. | June 13, 1933 |
| 1,959,254 | Zerk | May 15, 1934 |
| 2,170,197 | Gumprich | Aug. 22, 1939 |
| 2,172,641 | Piron | Sept. 12, 1939 |
| 2,325,027 | Anway | July 27, 1943 |
| 2,347,780 | Hermanns | May 2, 1944 |